United States Patent [19]

Smith et al.

[11] 3,920,945
[45] Nov. 18, 1975

[54] MICROWAVE FLUID HEATER

[75] Inventors: Warren B. Smith; Harold L. Whitmer; Hazel G. Whitmer, all of Clinton, Iowa

[73] Assignees: Harold L. Whitmer; Hazel G. Whitmer, both of Clinton, Iowa

[22] Filed: Apr. 24, 1974

[21] Appl. No.: 463,597

[52] U.S. Cl. .................. 219/10.55 R; 219/10.55 A
[51] Int. Cl.² .......................................... H05B 9/06
[58] Field of Search ............ 219/10.55 R, 10.55 A, 219/10.55 E, 219/10.55 F, 10.55 M

[56] References Cited
UNITED STATES PATENTS

| 2,833,657 | 5/1958 | Copson | 219/10.55 R |
| 3,092,514 | 6/1963 | Tomberlin | 219/10.55 R |
| 3,462,575 | 8/1969 | Holaday | 219/10.55 R |
| 3,778,578 | 12/1973 | Long | 219/10.55 A |
| 3,812,315 | 5/1974 | Martin | 219/10.55 R |

Primary Examiner—Bruce A. Reynolds
Attorney, Agent, or Firm—John S. Roberts, Jr.

[57] ABSTRACT

A fluid heater is provided for heating dielectric fluids such as water, solutions and gaseous substances utilizing microwave energy. The apparatus consists of a vessel or tank having therein a microwave resonant chamber and a source of microwave energy. The vessel is provided with an inlet for admitting fluid, an outlet for heated fluid and temperature and pressure controls responsive to conditions within the vessel for heating the fluids to a predetermined desired degree. The microwave energy is directed by a wave guide within the vessel for obtaining maximum thermal efficiency. The heater finds utility in the heating of buildings, vehicles and other installations requiring use of a heated fluid and the heater produces no atmospheric or other pollutants in use.

5 Claims, 2 Drawing Figures

MICROWAVE FLUID HEATER

BACKGROUND OF THE INVENTION

The heating of homes, buildings and other structures has, in the past, been accomplished largely through the burning of fossil fuels at the site. The use of such fuels presents problems of distribution to the site and disposal of ash or residue, and the burning of such fuels contributes to atmospheric pollution, both of gaseous products and solid products including flyash, discharging into the atmosphere as well as ash residues which contain deleterious compounds which find their way into rivers and streams, causing pollution thereof. The prior art has taught the use of electrical energy for heating purposes but the vast preponderance of such use employs electrical resistance heating. Such systems are relatively slow and not responsive to demand or changing thermal requirements.

The prior art has suggested the use of microwave energy for heating fluids but, for the most part, such teachings have been directed to specialized applications in the chemical processing arts and the like. Accordingly, there has been a long felt need in the art for a simple, dependable fluid heater employing microwave energy which would find application in domestic and industrial heating.

SUMMARY OF THE INVENTION

The heater of the present invention provides a simple, dependable, economical means for supplying heating fluid in domestic, industrial and vehicular environments. The heater unit of the present invention enables the heating of a fluid to any predetermined temperature quickly and without override. The heater of the present invention may be the sole source of heat requirements of any given installation or may be used as a booster to supply peak demand requirements in existing systems.

It is among the objects of this invention to provide a fluid heater unit which does not depend on primary fossil fuels at the site of the installation, but instead, employs microwave energy from electricity generated at a remote source.

Another object of the invention is to provide such a microwave fluid heater which is thermally and electrically efficient and is immediately responsive to temperature conditions and requirements.

Another object of the invention is to provide a fluid heater which is trouble-free in use and has no moving parts, thereby assuring its dependability.

A further object of the invention is to provide a compact fluid heater which finds utility in a wide variety of installations, including domestic, industrial and vehicular (including marine and aeronautical).

A further object is to provide a fluid heater which is economical of construction and operation.

Further objects and advantages will be apparent to those skilled in the art from the detailed description which follows.

DETAILED DESCRIPTION OF THE INVENTION

Figure 1:
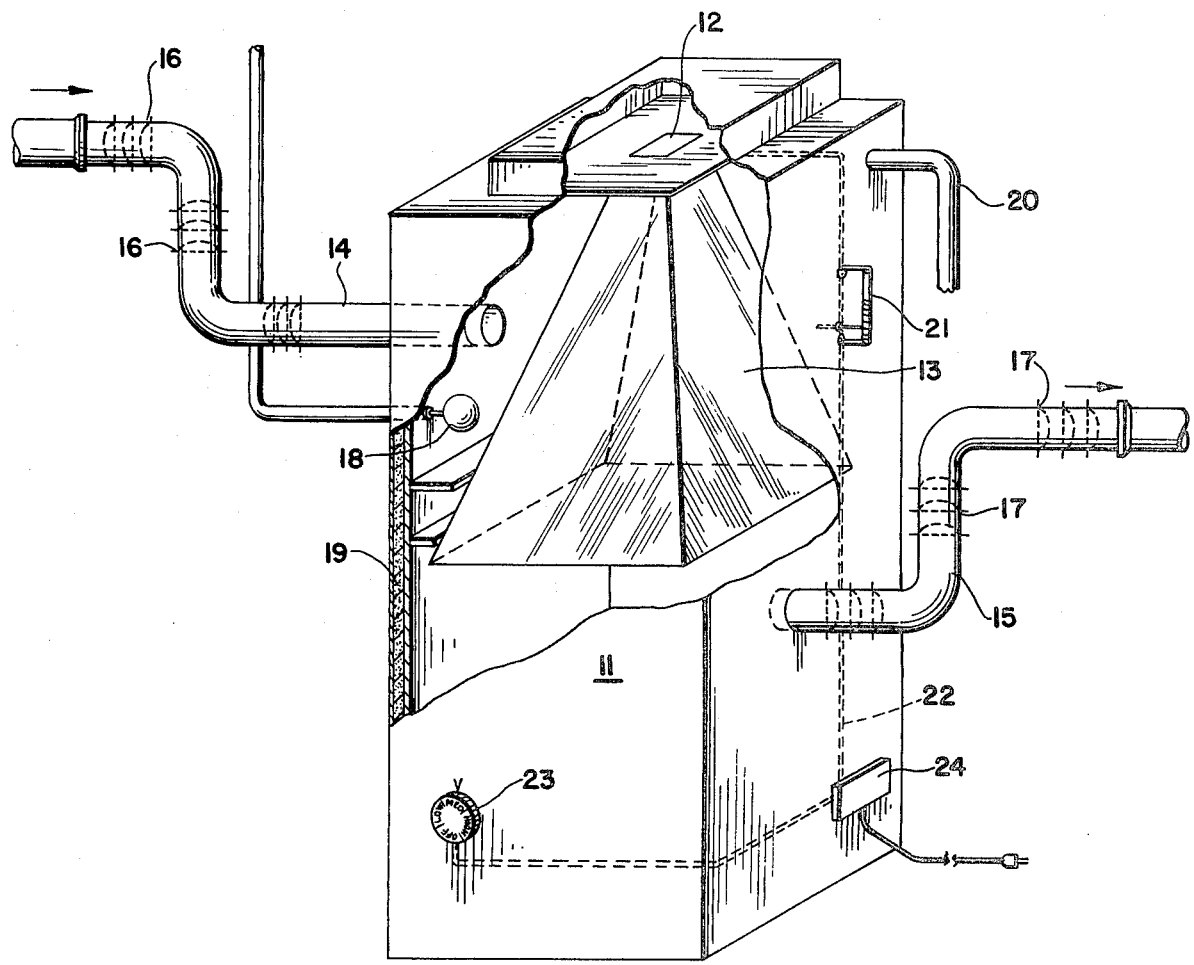
FIG. 1 is a perspective view of a fluid heater embodying the features of the present invention.

Referring to FIG. 1, a fluid heating vessel is indicated at 11 which bears a microwave generator 12 in the top thereof connecting with a wave guide 13 of generally pyramidal configuration. The vessel 11 is provided with a fluid inlet 14 and a fluid outlet 15. Inlet 14 preferably includes valve flow control means, not shown, and control means, not shown, responsive to temperature or other condition within the vessel. Both the inlet 14 and the outlet 15 are provided with microwave deflecting foils 16 and 17 respectively which prevent the influence of the microwave energy escaping externally of the heating vessel 11. A level control float and valve is indicated generally at 18 interconnected with the flow control means associated with the fluid inlet 14 to provide constant level of fluid within the heater vessel.

The vessel 11 is preferably provided with thermal insulation material indicated at 19. An overflow drain 20 is provided which may include pressure relief means, not shown, to prevent damage to the system in the event of failure of any of the control devices. A visual sight glass is shown at 21.

It will be understood that the temperature and flow control means are interconnected with the source of microwave energy by suitable electrical means indicated schematically by 22. The thermostat setting and control means is shown at 23 and the source of electrical energy for the unit is indicated at 24.

Figure 2:
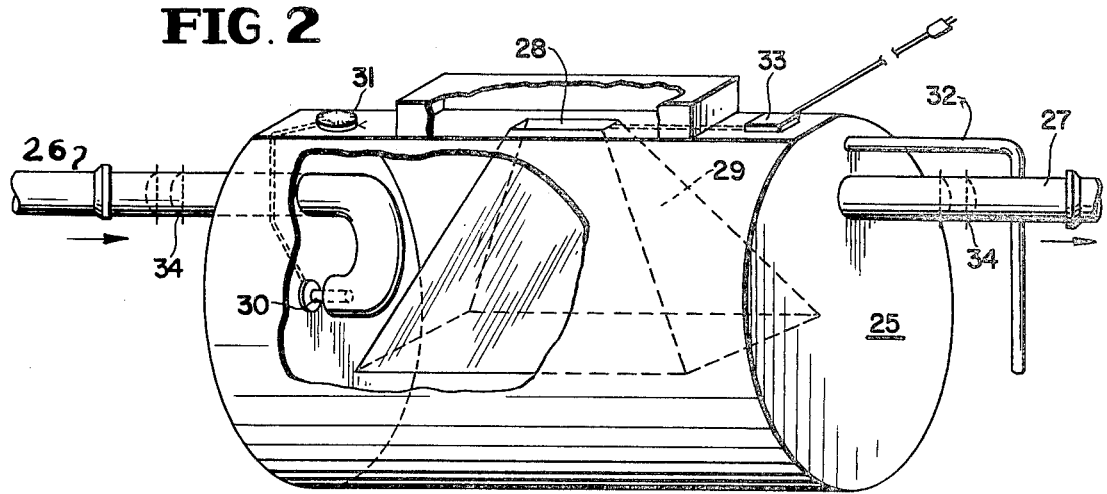
FIG. 2 is a view of an alternative form of the invention.

Referring to FIG. 2, the heater tank or vessel 25 is provided with a fluid inlet 26 and an outlet 27. The microwave source is shown at 28 including the wave guide 29 within the vessel 25. The inlet 26 includes valve means 30 interconnected with a thermostatic control. An overflow drain 32, which may include a pressure relief valve, not shown, as described in connection with FIG. 1. The source of electrical energy is shown at 33 which is suitably interconnected with the temperature and flow control means for controlling the microwave source 28. As in FIG. 1, the inlet and outlet are provided with deflecting foils 34 to contain the microwave energy within the vessel 25.

The microwave energy source may be any electrical high frequency generator such as an electronic oscillator or a magnatron, both are known in the art. Such microwave generators provide electro-magnetic waves and frequency range of about 1,500 to 2,500 megahertz. For optimum efficiency the wave guide preferably has a transverse dimension at least one-half the wave length of the high frequency power.

There is thus described an apparatus to produce hot water or steam in a new heating system. It may be used as a hot water heater with a holding tank for residential, commercial, and industrial usage. Modification of the invention can be made to serve as a booster unit for in-line installation in an existing hot water or steam system. It can be further modified to raise the temperature of any dielectric fluid, gas, or vapors for any application of this invention. While it is primarily utilized in the domestic heating installations, it will be apparent to those skilled in the art that the heater may also be used in industrial applications including continuous flow chemical reactors, evaporators and the like.

What is claimed is:

1. A system for heating dielectric fluids, including bottom, top, and spaced side wall means defining a fluid receiving vessel, fluid inlet means communicating with one side wall means, fluid outlet means communicating with another side wall means, a source of microwave energy operatively associated with the top wall means, wave guide means of electrically conductive material extending downwardly from said top wall means and including diverging wall means having a substantial vertical extent in relation to the vertical extent of said vessel side wall means and terminating below the level of said fluid inlet means so as to direct said microwave energy directly into fluid within said vessel, another fluid outlet means communicating with said vessel above the level of said fluid inlet means, control means responsive to temperature conditions within said vessel for controlling the source of microwave energy and means for regulating the flow of fluid into said vessel.

2. The fluid heater set forth in claim 1 wherein said wave guide means comprises a pyramidal shaped guide of electrically conductive material.

3. The fluid heater set forth in claim 1 including fluid level control means in said vessel.

4. The fluid heater set forth in claim 3 wherein said wave guide extends below the level of said level control means.

5. The fluid heater set forth in claim 1 including microwave deflecting means in said fluid inlet means and first-mentioned outlet means for containing microwave energy within said vessel.

* * * * *